United States Patent
Takeda et al.

(10) Patent No.: US 7,323,232 B2
(45) Date of Patent: Jan. 29, 2008

(54) RESIN COMPOSITION FOR SPACER, SPACER, AND LIQUID CRYSTAL DISPLAY DEVICE

(75) Inventors: Akihiko Takeda, Shizuoka (JP); Yoshio Sakakibara, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 10/695,906

(22) Filed: Oct. 30, 2003

(65) Prior Publication Data

US 2004/0086663 A1    May 6, 2004

(30) Foreign Application Priority Data

Oct. 31, 2002    (JP) ............................. 2002-316923

(51) Int. Cl.
*G03F 7/004* (2006.01)

(52) U.S. Cl. ..................... 428/1.55; 349/155; 313/257; 313/268; 430/96; 430/910

(58) Field of Classification Search ................. 428/1.1, 428/1.5, 1.54, 1.55; 349/155–157; 313/250, 313/257–259, 268, 288; 430/56, 96, 910
See application file for complete search history.

(56) References Cited

U.S. PATENT DOCUMENTS

| | | | | |
|---|---|---|---|---|
| 3,754,920 A | * | 8/1973 | Kuchta | 430/273.1 |
| 4,863,827 A | * | 9/1989 | Jain et al. | 430/145 |
| 5,294,516 A | * | 3/1994 | Sato et al. | 430/262 |
| 5,397,678 A | * | 3/1995 | Sato et al. | 430/258 |
| 5,451,650 A | * | 9/1995 | Siol et al. | 526/201 |
| 5,529,524 A | * | 6/1996 | Jones | 445/24 |
| 5,563,020 A | * | 10/1996 | Totsuka et al. | 430/259 |
| 5,593,802 A | * | 1/1997 | Sato et al. | 430/20 |
| 5,625,021 A | * | 4/1997 | Parusel et al. | 526/329.7 |
| 5,843,622 A | * | 12/1998 | Tomita et al. | 430/284.1 |
| 5,955,198 A | * | 9/1999 | Hashimoto et al. | 428/414 |
| 6,191,184 B1 | * | 2/2001 | Suzuki et al. | 522/79 |
| 6,569,603 B2 | * | 5/2003 | Furukawa | 430/287.1 |
| 6,582,862 B1 | * | 6/2003 | Nakamura et al. | 430/7 |
| 6,653,769 B1 | * | 11/2003 | Nishioka et al. | 313/292 |
| 6,790,568 B2 | * | 9/2004 | Goto | 430/7 |
| 6,899,980 B2 | * | 5/2005 | Takayanagi | 430/5 |

FOREIGN PATENT DOCUMENTS

| | | |
|---|---|---|
| JP | 62-090622 A | 4/1987 |
| JP | 11-288008 A | 10/1999 |
| JP | 11-323057 A | 11/1999 |
| JP | 2001-83527 A | 3/2001 |

\* cited by examiner

*Primary Examiner*—Rena Dye
*Assistant Examiner*—Sow-Fun Hon
(74) *Attorney, Agent, or Firm*—Sughrue Mion, PLLC

(57) ABSTRACT

To provide a resin composition for spacer useful for the formation of a pixel-patterned spacer on a substrate in a liquid crystal display device, a spacer using the composition, and a liquid crystal display device that can display high-quality images, a resin composition for spacer contains at least one resin selected from (1) an allyl-containing resin, (2) an allyl-and-hydroxyl-containing resin, and (3) a resin mixture of an allyl-containing resin and a hydroxyl-containing resin.

18 Claims, No Drawings

RESIN COMPOSITION FOR SPACER, SPACER, AND LIQUID CRYSTAL DISPLAY DEVICE

BACKGROUND OF THE INVENTION

1. Field of the Invention

The present invention relates to a resin composition for spacer which is useful for the formation of a pixel-patterned spacer on a substrate of a liquid crystal display device, a spacer using the composition, and a liquid crystal display device that can display images with high quality.

2. Description of the Related Art

Liquid crystal displays have been widely used for producing high-quality images. In general, such liquid crystal displays each include a pair of substrates and a liquid crystal layer being packed between the substrates and having a specific alignment. The cell gap between the substrates, i.e., the thickness of the liquid crystal layer must be maintained constant so as to keep good image quality. A spacer is generally used for maintaining the cell gap constant.

Inorganic particles such as silica particles are used as the spacer, but they remain on images to deteriorate image quality. As a possible solution to this problem, Japanese Patent Application Laid-Open (JP-A) No. 62-90622 proposes a spacer formed by photolithography using a resin composition for spacer.

According to this technique, a dotted spacer is formed by patterning, developing and baking the resin composition for spacer. However, the resulting dotted spacer has a low compressive strength and shows large plastic deformation when integrated into a panel. Thus, the liquid crystal layer may have a thickness lower than a target thickness or may not have a uniform thickness to thereby cause uneven images. In addition, a residue of the resin composition for spacer remains which must be removed for providing a highly precise liquid crystal display device.

Accordingly, an object of the present invention is to provide a resin composition for spacer which is satisfactorily free from residue after development, has a high compressive strength, is resistant to plastic deformation in integration into a panel and can easily and efficiently form a dotted spacer, a spacer using the composition, and a liquid crystal display device which has a targeted, uniform thickness in a liquid crystal layer and can display high-quality images.

SUMMARY OF THE INVENTION

The present invention provides a resin composition for spacer including at least one resin selected from the group consisting of (1) a resin containing at least an allyl group, (2) a resin containing at least an allyl group and hydroxyl group, and (3) a resin mixture containing an allyl-containing resin and a hydroxyl-containing resin. The resin composition for spacer is satisfactorily free from its residue after development, has a high compressive strength, is resistant to plastic deformation in integration into a panel and can easily and efficiently form a dotted spacer.

The present invention further provides a spacer formed by the resin composition for spacer of the present invention. The spacer can be a dotted spacer which is satisfactorily free from residue after development, has a high compressive strength and is resistant to plastic deformation in integration into a panel.

The present invention also provides a liquid crystal display device including a pair of substrates facing each other; a pixel-patterned spacer disposed between the pair of substrates for maintaining a cell gap therebetween constant; and a liquid crystal sealed into a space defined by the pair of substrates and the pixel-patterned spacer, wherein the pixel-patterned spacer is formed by the resin composition for spacer of the present invention. The liquid crystal display device has a targeted, uniform thickness in the liquid crystal layer and can thereby display images with high quality.

DESCRIPTION OF THE PREFERRED EMBODIMENTS (Resin Composition for Spacer)

The resin composition for spacer of the present invention comprises at least one resin selected from (1) a resin containing at least an allyl group, (2) a resin containing at least an allyl group and hydroxyl group, and (3) a resin mixture containing an allyl-containing resin and a hydroxyl-containing resin. It may further comprise a polymerizable monomer, a polymerization initiator, an extender, a coloring agent, and other components according to necessity.

The resin composition for spacer is preferably a thermoplastic resin composition can soften or become adhesive at 150° C. or lower, and is more preferably a photo-polymerizable resin composition that is cured and becomes alkali-insoluble only in its exposed portions after exposure with radiation and can satisfactorily serve as a resist.

—Allyl-containing Resin—

The allyl-containing resin can serve as a binder in the resin composition for spacer, is not specifically limited, as long as it has at least an allyl group, and can be selected according to the purpose.

Each of such allyl-containing resins can be used alone or in combination. Among them, resins containing at least an allyl-containing (meth)acrylate as a monomer unit are preferred, of which resins containing the allyl-containing (meth)acrylate and at least one monomer unit selected from (meth)acrylic acid and (meth)acrylates containing no allyl group are more preferred.

Examples of the allyl-containing (meth)acrylates include allyl (meth)acrylate, 2-methylallyl acrylate, crotyl acrylate, chloroallyl acrylate, phenylallyl acrylate, and cyanoallyl acrylate. Each of these can be used alone or in combination. Among them, allyl (meth)acrylate is preferred.

Examples of the (meth)acrylates containing no allyl group include benzyl (meth)acrylate, hydroxyalkyl (meth)acrylates, and other (meth)acrylates containing no allyl group. Each of these can be used alone or in combination.

Among the hydroxyalkyl (meth)acrylates, hydroxyethyl (meth)acrylates, hydroxy-n-propyl (meth)acrylates, and hydroxy-n-butyl (meth)acrylates are preferred.

The allyl-containing resin may further comprise other monomers. The other monomers include, but are not limited to, alkyl (meth)acrylates, aryl (meth)acrylates, and vinyl compounds.

Preferred examples of the alkyl (meth)acrylates and the aryl (meth)acrylates include methyl (meth)acrylate, ethyl (meth)acrylate, propyl (meth)acrylate, butyl (meth)acrylate, isobutyl (meth)acrylate, pentyl (meth)acrylate, hexyl (meth)acrylate, octyl (meth)acrylate, phenyl (meth)acrylate, benzyl acrylate, tolyl acrylate, naphthyl acrylate, and cyclohexyl acrylate.

Preferred examples of the vinyl compounds include styrene, α-methylstyrene, vinyltoluene, glycidyl methacrylate, acrylonitrile, vinyl acetate, N-vinylpyrrolidone, tetrahydrofurfuryl methacrylate, polystyrene macromonomer, and poly (methyl methacrylate) macromonomer.

Preferred examples of the allyl-containing resin are copolymers of (i) (meth)acrylic acid and (ii) allyl (meth) acrylate in a molar ratio of (i) to (ii) of preferably 2:98 to 80:20, and terpolymers of (i) (meth)acrylic acid, (ii) allyl (meth)acrylate, and (iii) benzyl (meth)acrylate. In the terpolymers, the contents of the components (i), (ii) and (iii) are preferably from 10% by mole to 40% by mole, from 20% by mole to 80% by mole, and from 10% by mole to 70% by mole, respectively.

The content of the allyl-containing monomer in the allyl-containing resin is preferably 10% by mole or more, i.e., from 10% by mole to 100% by mole, more preferably from 15% by mole to 90% by mole, and especially preferably from 20% by mole to 80% by mole.

The weight average molecular weight of the allyl-containing resin is preferably from 5000 to 100000, and more preferably from 8000 to 50000 in terms of polystyrene as determined by gel permeation chromatography (GPC).

When the weight average molecular weight is from 5000 to 100000, the resulting layer may have high strength.

The content of the allyl-containing resin is preferably from 15% by mass to 70% by mass, more preferably from 18% by mass to 60% by mass, and especially preferably from 25% by mass to 50% by mass of the total solid contents of the resin composition for spacer.

—Resin Mixture of Allyl-containing Resin and Hydroxyl-containing Resin—

The resin mixture is a mixture of the allyl-containing resin and a hydroxyl-containing resin and can serve as a binder.

The allyl-containing resin for use herein can be any of the aforementioned allyl-containing resins.

The hydroxyl-containing resin is not specifically limited, as long as it contains at least a hydroxyl group, and may be selected according to the purpose. It can be a resin derived from an oleophilic resin by introducing a hydroxyl group or an oleophilic resin converted from a hydroxyl-containing hydrophilic resin, as long as it is soluble in an organic solvent. Examples of the former are oleophilic graft polymers having a hydroxyl group. Examples of the latter are poly(vinyl alcohol)s that are modified so as to be soluble in organic solvents.

Each of the hydroxyl-containing resins can be used alone or in combination. Among them, resins comprising at least a hydroxyl-containing (meth)acrylate as a monomer unit are preferred, of which resins having at least the hydroxyl-containing (meth)acrylate and (meth)acrylic acid as monomer units are more preferred. Terpolymer resins containing the hydroxyl-containing (meth)acrylate, the (meth)acrylic acid, and another monomer copolymerizable with these monomers are especially preferred.

Preferred examples of the hydroxyl-containing (meth) acrylate are hydroxyalkyl (meth)acrylates and hydroxyaryl (meth)acrylates. Each of these can be used alone or in combination.

The alkyl group in the hydroxyalkyl (meth)acrylates is not specifically limited, may be selected according to the purpose but is preferably at least one selected from linear alkyl groups, branched alkyl groups, and cyclic alkyl groups, each of which has 2 to 12 carbon atoms and may have at least one substituent. Examples of such alkyl groups are ethyl group, propyl group, butyl group, hexyl group, octyl group, and cyclohexyl group.

The substituent herein is not specifically limited, may be selected according to the purpose, but preferred examples are phenyl group and other aryl groups, alkoxy groups, and halogen atoms.

Among the hydroxyalkyl (meth)acrylates, especially preferred are hydroxyethyl (meth)acrylates, hydroxy-n-propyl (meth)acrylates, and hydroxy-n-butyl (meth)acrylates.

Examples of the (meth)acrylate containing no hydroxyl group are allyl (meth)acrylate, benzyl (meth)acrylate, and other (meth)acrylates containing no hydroxyl group. Each of these can be used alone or in combination.

The other monomer is not specifically limited, may be selected according to the purpose and includes, for example, alkyl (meth)acrylates, aryl (meth)acrylates, and vinyl compounds as in the allyl-containing resins.

Preferred examples of the hydroxyl-containing resins are copolymers of (i) (meth)acrylic acid and (ii) 2-hydroxyethyl methacrylate in a molar ratio of (i) to (ii) of preferably 2:98 to 80:20, and terpolymer resins of (i) (meth)acrylic acid, (ii) 2-hydroxyethyl methacrylate, and (iii) benzyl (meth)acrylate. In the terpolymers, the contents of the components (i), (ii) and (iii) are preferably from 10% by mole to 40% by mole, from 5% by mole to 40% by mole, and from 10% by mole to 85% by mole, respectively.

The content of hydroxyl-containing monomer in the hydroxyl-containing resin is preferably 10% by mole or more, i.e., from 10% by mole to 100% by mole, more preferably from 15% by mole to 90% by mole, and especially preferably from 20% by mole to 80% by mole.

The weight average molecular weight of the hydroxyl-containing resin is preferably from 5000 to 100000, and more preferably from 8000 to 50000 in terms of polystyrene as determined by gel permeation chromatography (GPC).

When the weight average molecular weight is from 5000 to 100000, the resulting layer may have high strength.

The weight ratio of the allyl-containing resin to the hydroxyl-containing resin in the resin mixture is preferably from 1:0.1 to 1:10, and more preferably from 1:1 to 1:5.

The content of the resin mixture is preferably from 15% by mass to 70% by mass, more preferably from 18% by weigh to 60% by mass, and further preferably from 25% by mass to 50% by mass of the total solid contents of the resin composition for spacer.

—Resin Containing Allyl Group and Hydroxyl Group—

The resin containing at least an allyl group and a hydroxyl group is not specifically limited, as long as it contains at least an allyl group and a hydroxyl group in its molecule, may be selected according to the purpose and includes, for example, quaterpolymers of 2-hydroxyethyl methacrylate, methacrylic acid, allyl methacrylate, and benzyl methacrylate.

The resin containing an allyl group and a hydroxyl group can be prepared by polymerizing the allyl-containing (meth) acrylate, the hydroxyalkyl (meth)acrylate, and other monomer unit(s) according to necessity.

In the resin containing an allyl group and a hydroxyl group, the content of the allyl-containing monomer is preferably 15% by mole or more, and more preferably from 25% by mole to 50% by mole. The content of the hydroxyl-containing monomer is preferably 5% by mole or more, and more preferably from 10% by mole to 20% by mole.

The content of the resin containing an allyl group and a hydroxyl group is preferably from 15% by mass to 80% by mass, more preferably from 18% by mass to 70% by mass, and further preferably from 25% by mass to 60% by mass of the total solid contents of the resin composition for spacer.

—Polymerizable Monomer—

The polymerizable monomer is not specifically limited, as long as it has at least one ethylenically unsaturated group that can undergo addition polymerization, may be selected according to the purpose and includes, for example, ester compounds, amide compounds, and other compounds. Each of these can be used alone or in combination.

Examples of the ester compounds are monofunctional (meth)acrylic esters, polyfunctional (meth)acrylic esters, itaconic esters, crotonic esters, isocrotonic esters, maleic esters, and other ester compounds. Each of these ester compounds can be used alone or in combination. Among them, monofunctional (meth)acrylic esters and polyfunctional (meth)acrylic esters are preferred.

Examples of the monofunctional (meth)acrylic esters are polyethylene glycol mono(meth)acrylate, polypropylene glycol mono(meth)acrylate, and phenoxyethyl mono(meth) acrylate.

Examples of the polyfunctional (meth)acrylic esters are polyethylene glycol di(meth)acrylate, ethylene glycol di(meth)acrylate, triethylene glycol di(meth)acrylate, 1,3-butanediol di(meth)acrylate, tetramethylene glycol di(meth) acrylate, hexanediol di(meth)acrylate, pentaerythritol tri (meth)acrylate, pentaerythritol tetra(meth)acrylate, dipentaerythritol di(meth)acrylate, dipentaerythritol tri (meth)acrylate, dipentaerythritol tetra(meth)acrylate, dipentaerythritol hexa(meth)acrylate, dipentaerythritol poly (meth)acrylate, sorbitol tri(meth)acrylate, sorbitol tetra (meth)acrylate, trimethylolethane tri(meth)acrylate, neopentyl glycol di(meth)acrylate, and hexanediol di(meth) acrylate.

Among them, dipentaerythritol poly(meth)acrylates are preferred.

Examples of the polyfunctional (meth)acrylic esters also include (meth)acrylates prepared by adding ethylene oxide or propylene oxide to a polyfunctional alcohol such as glycerol or trimethylolethane, and converting the resulting adduct into a (meth)acrylate; urethane acrylates described in Japanese Patent Application Publication (JP-B) No. 48-41708, JP-B No. 50-6034, and JP-A No. 51-37193; polyester acrylates described in JP-A No. 48-64183, JP-B No. 49-43191, and JP-B No. 52-30490; epoxy acrylates as reaction products between an epoxy resin and (meth)acrylic acid; and (meth)acrylic esters, urethane (meth)acrylate, and vinyl esters described in JP-A No. 60-258539.

Examples of the other ester compounds are trimethylolpropane tri(acryloyloxypropyl) ether, tri(acryloyloxyethyl) isocyanurate, photo-curable monomers and oligomers described in Journal of the Adhesion Society of Japan, Vol. 20, No. 7, p. 300-308.

The amide compounds include, for example, amides (monomers) between an unsaturated carboxylic acid and an aliphatic polyamine compound, such as methylenebis(meth) acrylamide, 1,6-hexamethylenebis(meth)acrylamide, diethylenetriamine tris(meth)acrylamide, and xylylenebis(meth) acrylamide, as well as (meth)acrylamides described in JP-A No. 60-258539.

Examples of the other compounds can be found as allyl compounds in JP-A No. 60-258539.

The content of the polymerizable monomer(s) is preferably from 10% by mass to 60% by mass, and more preferably from 20% by mass to 50% by mass of the total solid contents of the resin composition for spacer.

—Polymerization Initiator—

The resin composition for spacer preferably comprises at least one component having a molecular extinction coefficient of about 50 or more in wavelengths of about 300 to about 500 nm as the polymerization initiator. Examples of such components are aromatic ketones, lophine dimers, benzoin, benzoin ethers, polyhalogens, halogenated hydrocarbon derivatives, ketone compounds, ketoxime compounds, organic peroxides, thio compounds, hexaaryl-biimidazoles, aromatic onium salts, and ketoxime ethers described in JP-A No. 02-48664, JP-A No. 01-152449, and JP-A No. 02-153353.

Each of these can be used alone or in combination. Among them, preferred examples are a combination of 4,4'-bis(diethylamino)benzophenone with 2-(o-chlorophenyl)-4,5-diphenylimidazole dimer; 4-[p-N,N'-di(ethoxycarbonylmethyl)-2,6-di(trichloromethyl)-s-triazine], and 2,4-bis-(trichloromethyl)-6-[4-(N,N'-diethoxycarbonylmethylamino)-3-bromophenyl]-s-triazine.

The amount of the polymerization initiator is preferably from 0.1% by mass to 20% by mass, and more preferably from 0.5% by mass to 10% by mass to the amount of the polymerizable monomer.

—Extender—

The resin composition for spacer preferably comprises an extender (filler).

The extender is not specifically limited, may be selected according to the purpose and includes, for example, silica, zinc oxide, barium sulfate, barium carbonate, alumina white, calcium carbonate, and calcium stearate. Each of these can be used alone or in combination. Among them, colorless extenders are preferred, of which silica and zinc oxide are especially preferred.

Preferred examples of the silica are commercially available under the trade names of R-972, #200 from Nippon Aerosil Co., Ltd. (Japan), Seahostar from Nippon Shokubai Corporation (Japan), and Snow Tex, Methanol Silica Sol, MA-ST-M, IPA-ST, MEK-ST, and MIBK-ST from Nissan Chemical Industries, Ltd. (Japan).

Preferred examples of the zinc oxide are commercially available under the trade names of ZnO-100 and ZnO-200 from Sumitomo Osaka Cement Co., Ltd. (Japan)

Among them, Snow Tex series and other colloidal silica are preferred.

The extender can be subjected, for example, to surface treatment with an appropriate silane coupling agent or titanate coupling agent for better dispersibility.

The average particle diameter of the extender is preferably from 0.01 to 0.5 μm, and more preferably from 0.02 to 0.4 μm.

If the average particle diameter is less than 0.01 μm, the extender may not be dispersed stably, and if it exceeds 0.5 μm, the resulting photoconductive resin layer may have a rough surface.

The amount of the extender is preferably from 5% by mass to 50% by mass, more preferably from 10% by mass to 40% by mass, and further preferably from 15% by mass to 35% by mass of the total solid contents of the resin composition for spacer.

If the amount of the extender is less than 5% by mass, the resulting layer may not have sufficient film strength and may fail to prevent decreased thickness in transfer or damage by brush in development. If it exceeds 50% by mass, bubbles are apt to be included between layers in transfer to thereby decrease the transparency of the photoconductive resin layer.

The extender may be used in the form of a uniform dispersion in an appropriate dispersing agent.

The dispersing agent is not specifically limited, may be selected according to the purpose and is commercially available, for example, under the trade names of Solsperse 3000, 9000, 17000, 20000, and 27000 from Avecia Ltd. (UK), Ajisper PB-711, PN-411, and PA-111 from Ajinomono-Fine-Techno Co., Inc. (Japan), and EFKA-766, 5244, 71, 65, 64, 63, and 44 from EFKA ADDITIVES (Netherlands). Among them, Solsperse 20000 is preferred.

The amount of the dispersing agent is preferably from 0.5 to 100 parts by mass relative to 100 parts by mass of the extender for better dispersion.

The dispersion containing the extender dispersed in the dispersing agent may further comprise a surfactant according to necessity for more stable dispersion.

The surfactant includes, but is not specifically limited to, alkyl naphthalenesulfonates, phosphoric esters, and other anionic surfactants; amine salts and other cationic surfactants; aminocarboxylic acids, betaine compounds, and other amphoteric surfactants.

—Coloring Agent—

The resin composition for spacer may further comprise a coloring agent according to the purpose.

The coloring agent includes, but is not specifically limited to, organic pigments, inorganic pigments, and dyes. Each of these can be used alone or in combination.

Among them, coloring agents that are fadable by development or heat treatment are preferred.

Examples of the coloring agents are auramine (Color Index Number (C.I.) 41000), Fat Black HB (C.I. 26150), Monolite Fast Black B (C.I. Pigment Black 1), C.I. Pigment Green 7, C.I. Pigment Green 36, C.I. Pigment Brown 23, C.I. Pigment Brown 25, C.I. Pigment Brown 26, Pigment Black 7, Permanent Carmine FBB (C.I. Pigment Red 146), Permanent Ruby FBH(C.I. Pigment Red 11), Fastel Pink B Supra (C.I. Pigment Red 81), C.I. Pigment Red 97, C.I. Pigment Red 122, C.I. Pigment Red 149, C.I. Pigment Red 168, C.I. Pigment Red 177, C.I. Pigment Red 180, C.I. Pigment Red 192, C.I. Pigment Red 215, C.I. Pigment Red 123, C.I. Pigment Red 213, C.I. Pigment Red 217, C.I. Pigment Red 220, C.I. Pigment Red 223, C.I. Pigment Red 224, C.I. Pigment Red 226, C.I. Pigment Red 227, C.I. Pigment Red 228, C.I. Pigment Red 240, C.I. Pigment Red 48, C.I. Pigment Red 1, C.I. Pigment Red 209, Monolite Yellow GT (C.I. Pigment Yellow 12), Permanent Yellow GR (C.I. Pigment Yellow 17), Permanent Yellow HR (C.I. Pigment Yellow 83), C.I. Pigment Yellow 20, C.I. Pigment Yellow 24, C.I. Pigment Yellow 83, C.I. Pigment Yellow 86, C.I. Pigment Yellow 93, C.I. Pigment Yellow 109, C.I. Pigment Yellow 110, C.I. Pigment Yellow 117, C.I. Pigment Yellow 125, C.I. Pigment Yellow 137, C.I. Pigment Yellow 138, C.I. Pigment Yellow 139, C.I. Pigment Yellow 147, C.I. Pigment Yellow 148, C.I. Pigment Yellow 153, C.I. Pigment Yellow 154, C.I. Pigment Yellow 166, C.I. Pigment Yellow 168, C.I. Pigment Yellow 185, C.I. Pigment Orange 36, C.I. Pigment Orange 43, C.I. Pigment Orange 51, C.I. Pigment Orange 55, C.I. Pigment Orange 59, C.I. Pigment Orange 61, Hosterberm Red ESB (C.I. Pigment Violet 19), Monastral Fast Blue (C.I. Pigment Blue 15), C.I. Pigment Violet 19, C.I. Pigment Violet 23, C.I. Pigment Violet 29, C.I. Pigment Violet 30, C.I. Pigment Violet 37, C.I. Pigment Violet 40, C.I. Pigment Violet 50, Victoria Pure Blue BO (C.I. 42595), Victoria Pure Blue BOH, Victoria Pure Blue BOH-M, Malachite Green, C.I. Pigment Blue 15:1, C.I. Pigment Blue 15:4, C.I. Pigment Blue 15:6, C.I. Pigment Blue 22, C.I. Pigment Blue 60, C.I. Pigment Blue 64, and carbon black.

—Other Components—

The other components are not specifically limited, may be selected according to the purpose and include, for example, polymerization inhibitors, ultraviolet absorbents, and other additives.

Examples of the polymerization inhibitors are phenothiazine, hydroquinone monomethyl ether, and other hydroquinones.

Examples of the ultraviolet absorbents are salicylates, benzophenones, benzotriazoles, cyanoacrylates, nickel chelates, and hindered amines, such as phenyl salicylate, 4-t-butylphenyl salicylate, 2,4-di-t-butylphenyl-3,5-di-t-butyl-4'-hydroxybenzoate, 2,4-dihydroxybenzophenone, 2-hydroxy-4-methoxybenzophenone, 2-hydroxy-4-n-octyloxybenzophenone, 2-(2'-hydroxy-5'-methylphenyl)benzotriazole, 2-(2'-hydroxy-3'-t-butyl-5'-methylphenyl)-5-chlorobenzotri azole, ethyl-2-cyano-3,3'-diphenyl acrylate, 2,2'-dihydroxy-4-methoxybenzophenone, nickel dibutyl dithiocarbamate, bis(2,2',6,6'-tetramethyl-4-piperidyl) sebacate, 4-hydroxy-2,2',6,6'-tetramethylpiperidine condensate, bis(2,2',6,6'-tetramethyl-4-piperidinyl) succinate, 2-[2-hydroxy-3,5-bis(α,α-dimethylbenzyl)phenyl]-2H-benz otriazole, and 7-{[4-chloro-6-(diethylamino)-5-triazin-2-yl]amino}-3-phen ylcoumarin.

(Photoconductive Transfer Material)

The resin composition for spacer of the present invention is advantageously used for the formation of a pixel-patterned spacer of a liquid crystal display device and is especially preferably used in a photoconductive resin layer of a photoconductive transfer material comprising a temporary support, an alkali-soluble thermoplastic resin layer, an interlayer, and a photoconductive resin layer arranged in this order. An embodiment of the photoconductive transfer material will be described in detail below.

—Photoconductive Resin Layer—

The photoconductive resin layer is formed by the resin composition for spacer of the present invention. The thickness of the photoconductive resin layer is preferably from 0.5 to 10 μm, and more preferably from 1 to 6 μm.

If the thickness is less than 0.5 μm, pin holes may form during coating, thus deteriorating satisfactory production. If it exceeds 10 μm, it may take an excessively long time to remove unexposed portions in development.

—Interlayer—

The interlayer is arranged adjacent to the photoconductive resin layer. When the photoconductive transfer material comprises an alkali-soluble thermoplastic resin layer, the interlayer is arranged between the photoconductive resin layer and the alkali-soluble thermoplastic resin layer. The presence of the interlayer between the photoconductive resin layer and the alkali-soluble thermoplastic resin layer inhibits mixing of the two layers due to organic solvents used in the formation of the two layers.

The interlayer is preferably dispersible or soluble in water or an alkaline aqueous solution.

Materials for the interlayer can be selected from known materials. Examples of such materials can be found in JP-A No. 46-2121 and JP-B No. 56-40824 as poly(vinyl ether)/maleic anhydride polymers, water-soluble salts of carboxyalkylcellulose, water-soluble cellulose ethers, water-soluble salts of carboxyalkyl starch, poly(vinyl alcohol)s, polyvinylpyrrolidones, polyacrylamides, water-soluble polyamides, water-soluble salts of poly(acrylic acid)s, gelatin, ethylene oxide polymers, water-soluble salts of the group consisting of starches and analogues thereof, styrene/maleic acid copolymers, and maleate resins.

Each of these can be used alone or in combination. Among them, hydrophilic polymers are preferred, of which at least a poly(vinyl alcohol) is more preferred. The combination use of a poly(vinyl alcohol) and a polyvinylpyrrolidone is especially preferred.

The poly(vinyl alcohol) is not specifically limited, may be selected according to the purpose and preferably one having a degree of saponification of 80% or more.

The content of the poly(vinyl alcohol), if any, is preferably from 1% by volume to 75% by volume, more preferably from 1% by volume to 60% by volume, and further preferably from 10% by volume to 50% by volume of the total solid contents of the interlayer.

If the content is less than 1% by volume, the interlayer may not be adhered to the photoconductive resin layer sufficiently. If it exceeds 75% by volume, the interlayer may not have satisfactory oxygen-barrier property.

The interlayer should preferably have a low oxygen permeability.

If the interlayer has a high oxygen permeability and low oxygen barrier property, a quantity of light to the photoconductive resin layer in exposure must be increased or the irradiation time must be increased, thus the resolution may decrease.

The thickness of the interlayer is preferably from about 0.1 to about 5 µm, and more preferably from about 0.5 to about 2 µm.

If the thickness is less than 0.1 µm, the interlayer may have excessively high oxygen permeability. If it exceeds 5 µm, it may take a long time to develop the photoconductive resin layer or to remove the interlayer.

—Alkali-soluble Thermoplastic Resin Layer—

The alkali-soluble thermoplastic resin layer must be soluble in an alkali for enabling alkali development and for inhibiting contamination of the receptor by the alkali-soluble thermoplastic resin layer that extends off upon transfer. Upon transfer of the photoconductive transfer material to a receptor, transfer failure may occur due to depressions and protrusions on the receptor. The alkali-soluble thermoplastic resin layer should preferably be capable of serving as a cushioning material for effectively preventing the transfer failure. More preferably, it is capable of deforming according to depressions and protrusions on the receptor when the photoconductive transfer material is heated and brought into intimate contact with the receptor.

A resin for forming the alkali-soluble thermoplastic resin layer is not specifically limited, may be selected according to the purpose but preferably one having a substantial softening point of 80° C. or lower. Examples of such resins having a substantial softening point of 80° C. or lower include saponification products of copolymers of ethylene and (meth)acrylic ester, saponification products of copolymers of styrene and (meth)acrylic ester, saponification products of copolymers of vinyltoluene and (meth)acrylic ester, saponification products of poly(meth)acrylic esters, saponification products of copolymers of (meth)acrylic ester copolymers of, e.g., butyl (meth)acrylate and vinyl acetate, as well as organic polymers that are soluble in an alkaline aqueous solution, in the organic polymers having a softening point of about 80° C. or lower described in "Manual of Plastics Properties", compiled by the Japan Plastics Industry Federation and Zen-Nihon Plastic Seikei Kogyo Rengokai ("Japan Plastic Molding Industry Association"), Tokyo, published by Kogyo Chosakai Publishing Co., Ltd., on Oct. 25, 1968. Each of these can be used alone or in combination.

The alkali-soluble thermoplastic resins having a substantial softening point of 80° C. or lower also include compositions having a substantial softening point of 80° C. or lower and comprising an organic polymer and a plasticizer that is miscible with the organic polymer, which organic polymer itself has a softening point of higher than 80° C.

The plasticizer is not specifically limited, may be selected according to the purpose and includes, for example, polypropylene glycol, polyethylene glycol, dioctyl phthalate, diheptyl phthalate, dibutyl phthalate, tricresyl phosphate, cresyldiphenyl phosphate, and biphenyldiphenyl phosphate.

For adjusting adhesion with the temporary support, the alkali-soluble thermoplastic resin layer may further comprise, for example, various polymers, a supercooling substance, an adhesion improver, a surfactant and a release agent, within ranges providing a substantial softening point of 80° C. or lower.

The thickness of the alkali-soluble thermoplastic resin layer is preferably from 6 to 100 µm, and more preferably from 6 to 50 µm.

If the thickness is less than 6 µm, the alkali-soluble thermoplastic resin layer may not completely absorb or cancel unevenness on a receptor having a thickness of 1 µm or more to thereby fail to serve as a cushioning layer. The thickness exceeding 100 µm is not desirable in view of development property and productivity.

—Temporary Support—

The temporary support preferably has an appropriate releasability from the alkali-soluble thermoplastic resin layer within ranges not adversely affecting the transfer procedure, is chemically and thermally stable and has flexibility.

Materials for the temporary support are not specifically limited, may be selected according to the purpose and include, for example, poly(ethylene tetrafluoride)s, poly(ethylene terephthalate)s, poly(ethylene naphthalate)s, polycarbonates, polyethylenes, and polypropylenes. Each of these materials can be used alone or in combination.

The temporary support may have any appropriate structure. For example, it may have either single layer structure or multilayer structure.

For better releasability from the alkali-soluble thermoplastic resin layer, it is preferred that the temporary support is not subjected to surface treatment such as glow discharge and does not have an undercoat layer such as a gelatin layer.

The thickness of the temporary support is preferably from 5 to 300 µm, and more preferably from 20 to 150 µm.

The temporary support preferably has an electrically conductive layer at least on one side thereof. Alternatively, the temporary support itself is preferably electrically conductive.

By allowing the temporary support having the aforementioned configuration, the temporary support or the receptor is not charged and does not attract dust in surroundings when the photoconductive transfer material having the temporary support is adhered to the receptor and the temporary support is then removed therefrom. Thus, the alkali-soluble thermoplastic resin layer can remain free from dust even after the removal of the temporary support, thus effectively inhibiting undesired pinholes as a result of the formation of excess unexposed portions in exposure process.

The surface electric resistance of the electrically conductive layer of the temporary support or of the electrically conductive temporary support is preferably $10^{13}$ Ω or less.

The temporary support can become electrically conductive by adding an electrically conductive substance.

Such electrically conductive substances include, but are not specifically limited to, metal oxides, and antistatic agents.

Examples of the metal oxides are zinc oxide, titanium oxide, tin oxide, aluminum oxide, indium oxide, silicon oxide, magnesium oxide, barium oxide, and molybdenum oxide. Each of these can be used alone or in combination.

The metal oxides may be in the form of, for example, crystalline fine particles, and complex fine particles.

Examples of the antistatic agents are Electrostripper A (trade name, available from Kao Corporation, Japan), DKS Elenon No. 19 (trade name, available from Dai-ichi Kogyo Seiyaku Co., Ltd., Japan), and other salts of alkyl phosphates as anionic surfactants; Amorgen K (trade name, available from Dai-ichi Kogyo Seiyaku Co., Ltd., Japan) and other betaine amphoteric surfactants; Nissan Nonion L (trade name, available from NOF Corporation, Japan) and other polyoxyethylene fatty acid ester nonionic surfactants; Emulgen 106, 120, 147, 420, 220, 905, and 910 (trade names, available from Kao Corporation, Japan), Nissan Nonion E (trade name, available from NOF Corporation, Japan) and other polyoxyethylene alkyl ether nonionic surfactants; as well as polyoxyethylene alkyl phenyl ethers, polyhydric alcohol fatty acid esters, polyoxyethylene sorbitan fatty acid esters, polyoxyethylene alkylamines, and other nonionic surfactants. Each of these can be used alone or in combination.

Materials for the electrically conductive layer can be selected from known electrically conductive substances, of which $ZnO$, $TiO_2$, $SnO_2$, $Al_2O_3$, $In_2O_3$, $SiO_2$, $MgO$, $BaO$, $MoO_3$ are preferred for more stable electric conduction not depending on the environmental moisture. Each of these can be used alone or in combination.

The volume resistance of the metal oxide or the electrically conductive substance is preferably $107$ $\Omega \cdot cm$ or less, and more preferably $10^5$ $\Omega \cdot cm$ or less.

The average particle diameter of the metal oxide or the electrically conductive substance is preferably from 0.01 to 0.7 μm, and more preferably from 0.02 to 0.5 μm.

The electrically conductive layer may further comprise a binder. Such binders include, but are not limited to, gelatin; cellulose nitrate, cellulose triacetate, cellulose diacetate, cellulose acetate butyrate, cellulose acetate propionate, and other cellulose esters; homopolymers and copolymers comprising, for example, any of vinylidene chloride, vinyl chloride, styrene, acrylonitrile, vinyl acetate, acrylic esters of alkyls each having 1 to 4 carbon atoms, and vinylpyrrolidone; soluble polyesters, polycarbonates, and soluble polyamides.

—Other Layers—

The photoconductive transfer material may have any other layers. The other layer is not specifically limited, may be selected according to the purpose and a preferred example is a cover film.

The cover film serves to protect the photoconductive transfer material from stain or damage during storage and can be prepared from the same or similar material as the temporary support.

The cover film should be one that can be easily peeled off from the photoconductive resin layer. Preferred examples thereof are silicone paper, polyolefin sheets and films, and polytetrafluoroethylene sheets and films, of which polyethylene sheets and films, and polypropylene sheets and films are especially preferred.

The thickness of the cover film is preferably from about 5 to about 100 μm, and more preferably from about 10 to about 30 μm.

The photoconductive transfer material can be prepared, for example, by any of the following processes. In a first process, a coating liquid for the alkali-soluble thermoplastic resin layer is applied to the temporary support and is dried to form the alkali-soluble thermoplastic resin layer; a coating liquid for the interlayer comprising a solvent that does not dissolve the thermoplastic resin layer is applied to the thermoplastic resin layer and is dried to form the interlayer; and a coating liquid for the photoconductive resin layer comprising a solvent that does not dissolve the interlayer is applied to the interlayer and is dried to form the photoconductive resin layer. In a second process, the photoconductive resin layer is formed on the cover film, and separately, the alkali-soluble thermoplastic resin layer and the interlayer are formed on the temporary support, and the resulting two articles are laminated with each other so that the interlayer and the photoconductive resin layer are in contact with each other. In a third process, the photoconductive resin layer and the interlayer are sequentially formed on the cover film, separately the alkali-soluble thermoplastic resin layer is formed on the temporary support, and the resulting two articles are laminated so that the interlayer and the alkali-soluble thermoplastic resin layer are in contact with each other.

The photoconductive transfer material comprising the resin composition for spacer of the present invention can be advantageously used in the formation of spacers and in the formation of images. In this case, the receptor can be, for example, a transparent substrate (glass substrate) in a liquid crystal display device, a substrate having a transparent conductive film such as an indium tin oxide (ITO) film, and a substrate having a color filter.

An example of the formation of a liquid crystal display device member or the formation of images using the photoconductive transfer material of the present invention will be illustrated below.

Initially, the photoconductive transfer material is placed on the receptor, the cover film is removed from the photoconductive transfer material, and the photoconductive resin layer is laminated onto the receptor by hot-pressing. The lamination can be performed by using a known or conventional laminator such as a vacuum laminator. For better productivity, an autocut laminator can also be used.

Next, the temporary support is peeled off from the alkali-soluble thermoplastic resin layer, the photoconductive resin layer is exposed to radiation through the alkali-soluble thermoplastic resin layer and the interlayer using a predetermined mask and thereby developed. Thus, an image in the photoconductive resin layer is formed when the coloring agent in the photoconductive resin layer does not lose its color in this procedure.

In conventional equivalents, a temporary support cannot be peeled off from an alkali-soluble thermoplastic resin layer smoothly, and a photoconductive resin layer may be peeled off from an interlayer. This problem can be solved by the present invention and can more effectively be solved when the resin composition for spacer in the photoconductive resin layer comprises the extender.

The photoconductive resin layer can be developed according to a conventional alkali development procedure. For example, the exposed receptor is dipped in a development bath containing a developer such as a solvent-based or water-based developer, especialy an alkaline aqueous solution (an alkaline developer), or the developer is applied to the receptor, for example, by spraying, and the surface of the receptor is rubbed using a rotary brush or a wet sponge or sonicated to thereby develop the photoconductive resin layer.

A temperature for the development is generally preferably from about room temperature to about 40° C. The receptor is preferably rinsed after the development.

An alkaline aqueous solution for use to dissolve the photoconductive resin layer and the alkali-soluble thermoplastic resin layer in the development or the removal of unnecessary portions after exposure is preferably a diluted aqueous solution of an alkaline substance (a basic substance). The alkaline aqueous solution preferably further comprises a small amount of an organic solvent that is miscible with water.

The alkaline substance includes, but is not specifically limited to, sodium hydroxide, potassium hydroxide, and other alkali metal hydroxides; sodium carbonate, potassium carbonate, and other alkali metal carbonates; sodium hydrogencarbonate, potassium hydrogencarbonate, and other alkali metal hydrogencarbonates; sodium silicate, potassium silicate, and other alkali metal silicates; sodium metasilicate, potassium metasilicate, and other alkali metal metasilicates; triethanolamine, diethanolamine, monoethanolamine, morpholine; tetramethylammonium hydroxide and other tetraalkylammonium hydroxides, as well as trisodium phosphate. Each of these can be used alone or in combination.

The alkaline aqueous solution preferably has a concentration of the alkaline substance of 0.01% by mass to 30% by mass and pH of 8 to 14.

The organic solvent that is miscible with water includes, but is not specifically limited to, methanol, ethanol, 2-propanol, 1-propanol, butanol, diacetone alcohol, ethylene glycol monomethyl ether, ethylene glycol monoethyl ether, ethylene glycol mono-n-butyl ether, benzyl alcohol, acetone, methyl ethyl ketone, cyclohexanone, $\epsilon$-caprolactone, $\gamma$-butyrolactone, dimethylformamide, dimethylacetamide, hexamethylphosphoramide, ethyl lactate, methyl lactate, $\epsilon$-caprolactam, and N-methylpyrrolidone.

The amount of the organic solvent that is miscible with water is preferably from 0.1% by mass to 30% by mass.

The alkaline aqueous solution may further comprise any of various surfactants in an amount of preferably from 0.01% by mass to 10% by mass.

(Spacer)

The spacer can be prepared preferably by using the resin composition for spacer of the present invention, and more preferably by using the photoconductive transfer material of the present invention. In the latter case, the spacer can be prepared, for example, in the following manner. The photoconductive resin layer of the photoconductive transfer material is applied to the receptor, the temporary support is then peeled off from the alkali-soluble thermoplastic resin layer to thereby transfer the photoconductive resin layer to the receptor, the photoconductive resin layer is exposed to radiation, unexposed portions in the photoconductive resin layer are removed using the alkaline aqueous solution, and exposed portions alone are cured.

(Liquid Crystal Display Device)

The liquid crystal display device of the present invention comprises a pair of substrates facing each other and a liquid crystal packed between the pair of substrates and further comprises a pixel-patterned spacer arranged between the substrates for maintaining the cell gap between the two substrates constant, which pixel-patterned spacer is formed from the spacer of the present invention.

The pixel-patterned spacer has a plastic deformation of preferably 0.3 µm or less, more preferably 0.2 µm or less, and further preferably 0.15 µm or less, as determined in a compression test at a load speed of 0.145 gf/sec, a load of 2 gf, a retention time of 5 sec, and a measurement temperature of 160° C. using a cylindrical penetrator (indenter) having a diameter of 50 µm.

If the plastic deformation exceeds 0.3 µm, the resulting dotted spacer may have a low compressive strength and show large plastic deformation when integrated into a panel. Accordingly, the liquid crystal layer may not have a targeted thickness.

Examples of the liquid crystal in the liquid crystal display device include supertwist nematic (STN) liquid crystal, twist nematic (TN) liquid crystal, guest host (GH) liquid crystal, electrically controlled birefringence (ECB) liquid crystal, ferroelectric liquid crystal, antiferroelectric liquid crystal, vertically aligned (VA) liquid crystal, and axially asymmetric aligned (ASM) liquid crystal.

The liquid crystal display device may have a basic configuration selected from, for example, (1) a liquid crystal display device comprising an active substrate, a color-filter-bearing substrate facing the active substrate with the interposition of a spacer, and a liquid crystal material encapsulated in the space between the two substrates, which active substrate has driver elements such as thin film transistors (TFTs) and picture electrodes (conductive layer) arrayed thereon, and which color-filter-bearing substrate has a color filter and a counter electrode (conductive layer); (2) a liquid crystal display device comprising a monolithic active substrate having a color filter directly arranged on the active substrate, a counter substrate having a counter electrode (conductive layer) facing the active substrate with the interposition of a spacer, and a liquid crystal material encapsulated in the space between the two substrates.

The liquid crystal display device of the present invention can be advantageously used in various liquid crystal displays.

The present invention will be illustrated in further detail with reference to several examples below, which are not intended to limit the scope of the present invention.

EXAMPLE 1

A coating liquid for a thermoplastic resin layer was prepared by mixing 15 parts by mass of a quaterpolymer of methyl methacrylate/2-ethylhexyl acrylate/benzyl methacrylate/methacrylic acid (molar ratio: 55/28.8/11.7/4.5) having a weight-average molecular weight of about 9000, 6.5 parts by mass of polypropylene glycol diacrylate having a weight-average molecular weight of about 822, 1.5 parts by mass of tetraethylene glycol dimethacrylate, 0.5 part by weight of p-toluenesulfonamide, 1.0 part by weight of benzophenone, and 30 parts by mass of methyl ethyl ketone. The coating liquid was applied to a temporary support made of a poly(ethylene terephthalate) film 100 µm thick and was dried to yield a thermoplastic resin layer 20 µm thick.

Next, a coating liquid for an interlayer was prepared by mixing 130 parts by mass of a poly(vinyl alcohol) PVA 205 (trade name, available from Kuraray Corporation, Japan) having a degree of saponification of 80%, 60 parts by mass of a polyvinylpyrrolidone PVP K-90 (trade name, available from GAF Corporation, NJ), 10 parts by mass of a fluorine-containing surfactant Surflon (trade name, available from Asahi Glass Co., Ltd., Japan), and 3350 parts by mass of distilled water. The coating liquid was applied to the above-formed thermoplastic resin layer and was dried to yield an interlayer 1.6 µm thick.

Next, a coating liquid for a photoconductive resin layer was prepared by mixing 3.0 parts by mass of a methacrylic acid/allyl methacrylate copolymer (molar ratio: 20/80) having a weight-average molecular weight of about 40000, 1.8 parts by mass of dipentaerythritol hexaacrylate, 7.1 parts by mass of a 30% by mass dispersion of silica sol in methyl isobutyl ketone MIBK-ST (trade name, available from Nissan Chemical Industries, Japan), 0.001 part by weight of phenothiazine, 0.17 part by weight of 2,4-bis-(trichloromethyl)-6-[4-(N,N-diethoxycarbonylmethy lamino)-3-bromophenyl]-s-triazine, 0.02 part by weight of Victoria Pure Blue BOHM, 0.01 part by weight of a poly(N-propylperfluorooctane sulfonamide ethyl acrylate)-co-(polypropylene glycol methyl ether acrylate) (molar ratio: 40/60), 7.4 parts by mass of methyl ethyl ketone, 8.6 parts by mass of 1-methoxy-2-propyl acetate, and 0.5 part by weight of methanol. The coating liquid was applied to the interlayer and was dried to form a photoconductive resin layer 5.2 μm thick. A polypropylene cover film 12 μm thick was attached to the photoconductive resin layer by contact bonding and thereby yielded a photoconductive transfer material T1.

The photoconductive transfer material T1, from which the cover film was removed, was applied to a sputtered ITO film on a glass plate by hot-pressing at a linear pressure of 100 N/cm, a temperature of 130° C. and a conveying speed of 1 m/min. using a laminator VP-II (trade name, available from Taisei Laminator Co., Ltd., Japan).

The poly(ethylene terephthalate) temporary support was then removed off from the thermoplastic resin layer. The resulting article was subjected to proximity exposure at 40 mJ/cm² through a predetermined photomask using an ultrahigh pressure mercury lamp, and the thermoplastic resin layer and the interlayer were dissolved and removed using a 1% by mass aqueous triethanolamine solution. In this procedure, the photoconductive resin layer was not substantially developed.

The photoconductive resin layer was then developed using a 1% by mass aqueous sodium carbonate solution, unnecessary portions were removed by brushing, and the resulting article was baked at 230° C. for 120 minutes to form a columnar transparent pixel-patterned spacer (spacer dots) having a side of 16 μm and an average height of about 4.5 μm on the color-filter-bearing substrate.

The plastic deformation and removability of residue of the pixel-like patterned spacer were determined by the following methods. The results are shown in Table 1.

<Determination of Plastic Deformation>

The plastic deformation of the pixel-like patterned spacer was subjected to a compression test using a Dynamic Ultra High Hardness Tester DUH-W201 (trade name, available from Shimadzu Corporation, Japan) at a load speed of 0.145 gf/sec, a load of 2 gf, a retention time of 5 sec, and a measurement temperature of 160° C. using a cylindrical penetrator having a diameter of 50 μm.

<Determination of Removability of Residue>

The margins of the 16-μm square pixel-like patterned spacer were observed under a microscope at an magnification of 100 times, and the removability of residue was evaluated according to the following criteria.

[Criteria]
5: Excellent
4: Good
3: Somewhat poor
2 or less: Not usable

EXAMPLE 2

A photoconductive transfer material T2 was prepared and subjected to tests by the procedure of Example 1, except that the amount of the methacrylic acid/allyl methacrylate copolymer in the coating liquid for a photoconductive resin layer was changed from 3.0 parts by mass to 2.55 parts by mass, and that 0.45 parts by mass of a benzyl methacrylate/methacrylic acid copolymer (molar ratio: 78/22) having a weight-average molecular weight of about 40000 was further added to the coating liquid for a photoconductive resin layer. The results are shown in Table 1.

EXAMPLE 3

A photoconductive transfer material T3 was prepared and subjected to tests by the procedure of Example 1, except that the amount of the methacrylic acid/allyl methacrylate copolymer in the coating liquid for a photoconductive resin layer was changed from 3.0 parts by mass to 1.5 parts by mass, and that 1.5 parts by mass of a benzyl methacrylate/methacrylic acid copolymer (molar ratio: 78/22) having a weight-average molecular weight of about 40000 was further added to the coating liquid for a photoconductive resin layer. The results are shown in Table 1.

EXAMPLE 4

A photoconductive transfer material T4 was prepared and subjected to tests by the procedure of Example 1, except that 3.0 parts by mass of a benzyl methacrylate/methacrylic acid/allyl acrylate terpolymer (molar ratio: 26/48/26) having a weight-average molecular weight of about 30000 was used instead of 3.0 parts by mass of the methacrylic acid/allyl methacrylate copolymer in the coating liquid for a photoconductive resin layer. The results are shown in Table 1.

EXAMPLE 5

A photoconductive transfer material T5 was prepared and subjected to tests by the procedure of Example 1, except that the amount of the 30% by mass dispersion of silica sol in methyl isobutyl ketone MIBK-ST in the coating liquid for a photoconductive resin layer was changed from 7.1 parts by mass to 3.5 parts by mass. The results are shown in Table 1.

EXAMPLE 6

A photoconductive transfer material T6 was prepared by the procedure of Example 4 and was subjected to tests by the procedure of Example 1, except that the amount of the dipentaerythritol hexaacrylate in the coating liquid for a photoconductive resin layer was changed from 1.8 parts by mass to 3.0 parts by mass. The results are shown in Table 1.

EXAMPLE 7

A photoconductive transfer material T7 was prepared and subjected to tests by the procedure of Example 1, except that 3.0 parts by mass of a benzyl methacrylate/methacrylic acid/allyl methacrylate terpolymer (molar ratio: 26/24/50) having a weight-average molecular weight of about 30000 was used instead of 3.0 parts by mass of the methacrylic acid/allyl methacrylate copolymer in the coating liquid for a photoconductive resin layer. The results are shown in Table 1.

EXAMPLE 8

A photoconductive transfer material T8 was prepared and subjected to tests by the procedure of Example 1, except that 3.0 parts by mass of a 2-hydroxyethyl methacrylate/methacrylic acid/allyl methacrylate/benzyl methacrylate quaterpolymer (molar ratio: 17/12/48/23) having a weight-average molecular weight of about 40000 was used instead of 3.0 parts by mass of the methacrylic acid/allyl methacrylate copolymer in the coating liquid for a photoconductive resin layer. The results are shown in Table 1.

EXAMPLE 9

A photoconductive transfer material T9 was prepared and subjected to tests by the procedure of Example 1, except that 1.5 parts by mass of a 2-hydroxyethyl methacrylate/methacrylic acid/allyl methacrylate/benzyl methacrylate quaterpolymer (molar ratio: 17/12/48/23) having a weight-average molecular weight of about 40000 and 1.5 parts by mass of a methacrylic acid/allyl methacrylate/benzyl methacrylate terpolymer (molar ratio: 28/48/24) having a weight-average molecular weight of about 40000 were used instead of 3.0 parts by mass of the methacrylic acid/allyl methacrylate copolymer in the coating liquid for a photoconductive resin layer. The results are shown in Table 1.

EXAMPLE 10

A photoconductive transfer material T10 was prepared by the procedure of Example 8 and was subjected to tests by the procedure of Example 1, except that the 30% by mass dispersion of silica sol in methyl isobutyl ketone MIBK-ST was not added to the coating liquid for a photoconductive resin layer, and that the amount of the 2-hydroxyethyl methacrylate/methacrylic acid/allyl methacrylate/benzyl methacrylate quaterpolymer in the coating liquid for a photoconductive resin layer was changed from 3.0 parts by mass to 5.1 parts by mass. The results are shown in Table 1.

COMPARATIVE EXAMPLE 1

A photoconductive transfer material T11 was prepared and subjected to tests by the procedure of Example 1, except that 3.0 parts by mass of a benzyl methacrylate/methacrylic acid copolymer (molar ratio: 76/24) having a weight-average molecular weight of about 40000 was used instead of 3.0 parts by mass of the methacrylic acid/allyl methacrylate copolymer in the coating liquid for a photoconductive resin layer. The results are shown in Table 1.

TABLE 1

| | Photoconductive transfer material | Plastic deformation of spacer ($\mu$m) | Removability of residue |
|---|---|---|---|
| Example 1 | T1 | 0.10 | 4 |
| Example 2 | T2 | 0.11 | 4 |
| Example 3 | T3 | 0.12 | 5 |
| Example 4 | T4 | 0.11 | 4 |
| Example 5 | T5 | 0.11 | 5 |
| Example 6 | T6 | 0.11 | 4 |
| Example 7 | T7 | 0.13 | 5 |
| Example 8 | T8 | 0.09 | 5 |
| Example 9 | T9 | 0.11 | 4 |
| Example 10 | T10 | 0.06 | 5 |
| Com. Ex. 1 | T11 | 0.39 | 3 |

Table 1 shows that the pixel-patterned spacers formed from the photoconductive transfer materials T1 to T10 according to Examples 1 to 10 show plastic deformation smaller than and compressive strength higher than the pixel-patterned spacer formed from the photoconductive transfer material T11 according to Comparative Example 1. It also shows that the photoconductive transfer materials T1 to T10 of Examples 1 to 10 have higher removability of residue than the photoconductive transfer material T11 of Comparative Example 1.

EXAMPLE 11

—Preparation of Liquid Crystal Display—

A film of metal chromium 0.1 $\mu$m thick was formed by sputtering on a glass substrate having a predetermined size, was etched using a photoresist and thereby yielded a grid black matrix having predetermined dimensions. Red, green, and blue patterns having predetermined dimensions were then formed on the black matrix using a transfer color filter described in JP-A No. 11-64621. A protective layer made of an acrylic resin was formed on the patterns and was smoothed, an ITO transparent electrode was formed on the protective layer and thereby yielded a color-filter-bearing substrate.

Each of the photoconductive transfer materials T1 to T10, from which the cover film had been removed, was applied to the glass substrate so that the photoconductive resin layer faced the ITO transparent electrode by hot-pressing at a linear pressure of 100 N/cm, a temperature of 130° C. and a conveying speed of 1 m/min. using a laminator VP-II (trade name, available from Taisei Laminator Co., Ltd., Japan). The temporary support was then removed off from the thermoplastic resin layer.

The resulting article was subjected to proximity exposure (proximity alignment) at 40 mJ/cm$^2$ through a predetermined photomask using an ultra-high pressure mercury lamp, and the thermoplastic resin layer and the interlayer were dissolved and removed using a 1% by mass aqueous triethanolamine solution. In this procedure, the photoconductive resin layer was not substantially developed.

The photoconductive resin layer was then developed using a 1% by mass aqueous sodium carbonate solution, unnecessary portions were removed by brushing, and the resulting article was baked at 230° C. for 120 minutes to form a columnar transparent pixel-patterned spacer (spacer dots) having a side of 16 $\mu$m and an average height of about 4.5 $\mu$m on the color-filter-bearing substrate.

Next, a polyimide alignment film was formed on the color filter having the pixel-patterned spacer and was rubbed using a roll wrapped by a nylon fabric. An electrode substrate was placed so as to face the color-filter-bearing substrate, the two substrates were sealed using a sealant, a liquid crystal was injected into between the two substrate and thereby yielded color liquid crystal display devices L1 to L10 measured 26 cm diagonally.

The above-prepared color liquid crystal display devices can display high-quality images without any problems.

The present invention provides a resin composition for spacer which can easily and efficiently yield a spacer that is satisfactorily free from residue after development, has a high compressive strength and is resistant to plastic deformation in integration into a panel.

The present invention also provides a liquid crystal display device having a targeted, uniform thickness in its liquid crystal layer and can display high-quality images by using the spacer formed from the resin composition for spacer.

What is claimed is:

1. A method for forming a spacer comprising:

placing a photosensitive transfer material onto a receptor so that a photosensitive resin layer of the photosensitive transfer material is attached to the receptor, the photosensitive transfer material comprising a temporary support, an alkali-soluble thermoplastic resin layer, an interlayer, and the photosensitive resin layer arranged in this order;

peeling the temporary support off from the alkali-soluble thermoplastic resin layer;

exposing the photosensitive resin layer to radiation via the alkali-soluble thermoplastic resin layer and the interlayer;

removing the alkali-soluble thermoplastic resin layer and the interlayer; and removing unexposed portions in the photosensitive resin layer using an alkaline aqueous solution, and curing the exposed portions, wherein the photosensitive resin layer is formed from a resin composition for a spacer, the resin composition comprising:

at least one resin selected from
(1) a resin containing at least an allyl group, the resin being a benzyl methacrylate/methacrylic acid/allyl acrylate terpolymer,
(2) a resin containing at least an allyl group, and hydroxyl group, the resin comprising benzyl methacrylate, methacrylic acid and allyl acrylate monomer units, and
(3) a resin mixture containing an allyl-containing resin and a hydroxyl-containing resin, the allyl-containing resin being a benzyl methacrcylate/methacrylic acid/allyl acrylate terpolymer;

a polymerizable monomer;

a polymerization initiator; and an extender, wherein an amount of the extender is 5% by mass to 50% by mass of the total solid contents of the resin composition, wherein the resin composition for spacer is a photopolymerizable resin composition, whereby a spacer is formed.

2. A method for forming a spacer according to claim 1, wherein the at least one resin comprises an allyl-containing (meth)acrylate as a monomer unit.

3. A method for forming a spacer according to claim 2, wherein the allyl-containing (meth)acrylate is an allyl(meth)acrylate.

4. A method for forming a spacer according to claim 2, wherein the content of the allyl-containing monomer in the at least one resin is 10% by mole or more.

5. A method for forming a spacer according to claim 1, wherein the at least one resin comprises an allyl-containing (meth)acrylate, and at least one selected from (meth)acrylic acid, and a (meth)acrylate containing no allyl group.

6. A method for forming a spacer according to claim 5, wherein the (meth)acrylate containing no allyl group is at least one selected from benzyl (meth)acrylate, and a hydroxyalkyl (meth)acrylate.

7. A method for forming a spacer according to claim 1, wherein the at least one resin comprises a hydroxyl-containing (meth)acrylate as a monomer unit.

8. A method for forming a spacer according to claim 7, wherein the hydroxyl-containing (meth)acrylate is a hydroxyalkyl (meth)acrylate.

9. A method for forming a spacer according to claim 7, wherein the content of the hydroxyl-containing monomer in the at least one resin is 10% by mole or more.

10. A method for forming a spacer according to claim 1, wherein the at least one resin comprises a hydroxyl-containing (meth)acrylate, and at least one selected from (meth)acrylic acid, and a (meth)acrylate containing no hydroxyl group.

11. A method for forming a spacer according to claim 10, wherein the (meth)acrylate containing no hydroxyl group is at least one selected from benzyl (meth)acrylate and allyl (meth)acrylate.

12. A method for forming a spacer according to claim 1, wherein the content of the resin containing an allyl group (1) is from 15% by mass to 70% by mass of the total solid contents of the resin composition for spacer.

13. A method for forming a spacer according to claim 1, wherein the content of the resin containing an allyl group and hydroxyl group (2) is from 15% by mass to 80% by mass of the total solid contents of the resin composition for spacer.

14. A method for forming a spacer according to claim 1, wherein the content of the resin mixture of an allyl-containing resin and a hydroxyl-containing resin (3) is from 15% by mass to 70% by mass of the total solid contents of the resin composition for spacer.

15. A method for forming a spacer according to claim 1, wherein the extender has an average particle diameter of 0.01 to 0.5 μm.

16. A method for forming a spacer according to claim 1, wherein the resin composition further comprises a coloring agent.

17. A spacer formed by a method comprising:

placing a photosensitive transfer material onto a receptor so that a photosensitive resin layer of the photosensitive transfer material is attached to the receptor, the photosensitive transfer material comprising a temporary support, an alkali-soluble thermoplastic resin layer, an interlayer, and the photosensitive resin layer arranged in this order;

peeling the temporary support off from the alkali-soluble thermoplastic resin layer;

exposing the photosensitive resin layer to radiation via the alkali-soluble thermoplastic resin layer and the interlayer; and removing unexposed portions in the photosensitive resin layer using an alkaline aqueous solution, and curing the exposed portions, wherein the alkali-soluble resin layer and the interlayer are also removed when the unexposed portions in the photosensitive resin layer are removed using the alkaline aqueous solution, wherein the photosensitive resin layer is formed from a resin composition for a spacer, the resin composition comprising:

at least one resin selected from
(1) a resin containing at least an allyl group, the resin being a benzyl methacrylate/methacrylic acid/allyl acrylate terpolymer,
(2) a resin containing at least an allyl group and hydroxyl group, the resin comprising benzyl methacrylate, methacrylic acid and allyl acrylate monomer units, and
(3) a resin mixture containing an allyl-containing resin and a hydroxyl-containing resin, the allyl-containina resin being a benzyl methacrylate/methacrylic acid-lallyl acrylate terpolymer;

a polymerizable monomer;

a polymerization initiator; and an extender, wherein an amount of the extender is 5% by mass to 50% by mass of the total solid contents of the resin composition, wherein the resin composition for spacer is a photo-polymerizable resin composition.

18. A spacer formed by a method comprising:

placing a photosensitive transfer material onto a receptor so that a photosensitive resin layer of the photosensitive transfer material is attached to the receptor, the photosensitive transfer material comprising a temporary support, an alkali-soluble thermoplastic resin layer, an interlayer, and the photosensitive layer arranged in this order;

peeling the temporary support off from the alkali-soluble thermoplastic resin layer;

exposing the photosensitive resin layer to radiation via the alkali-soluble thermoplastic resin layer and the interlayer;

removing the alkali-soluble thermoplastic resin layer and the interlayer; and removing unexposed portions in the photosensitive resin layer using an alkaline aqueous solution, and curing the exposed portions, wherein the photosensitive resin layer is formed from a resin composition for a spacer, the resin composition comprising:

at least one resin selected from (1) a resin containing at least an allyl group, the resin being a benzvl methacrylate/methacrylic acid/allyl acrylate terpolymer, (2) a resin containing at least an allyl group and hydroxyl group, the resin comprising benzyl methacrylate, methacrylic acid and allyl acrylate monomer units, and (3) a resin mixture containing an allyl-containing resin and a hydroxyl-containing resin, the allyl-containing resin being a benzyl methacraylate/methacrylic acid/allylacrylate terpolymer;

a polymerizable monomer;

a polymerization initiator; and an extender, wherein an amount of the extender is 5% by mass to 50% by mass of the total solid contents of the resin composition, wherein the resin composition for spacer is a photo-polymerizable resin composition.

* * * * *